UNITED STATES PATENT OFFICE.

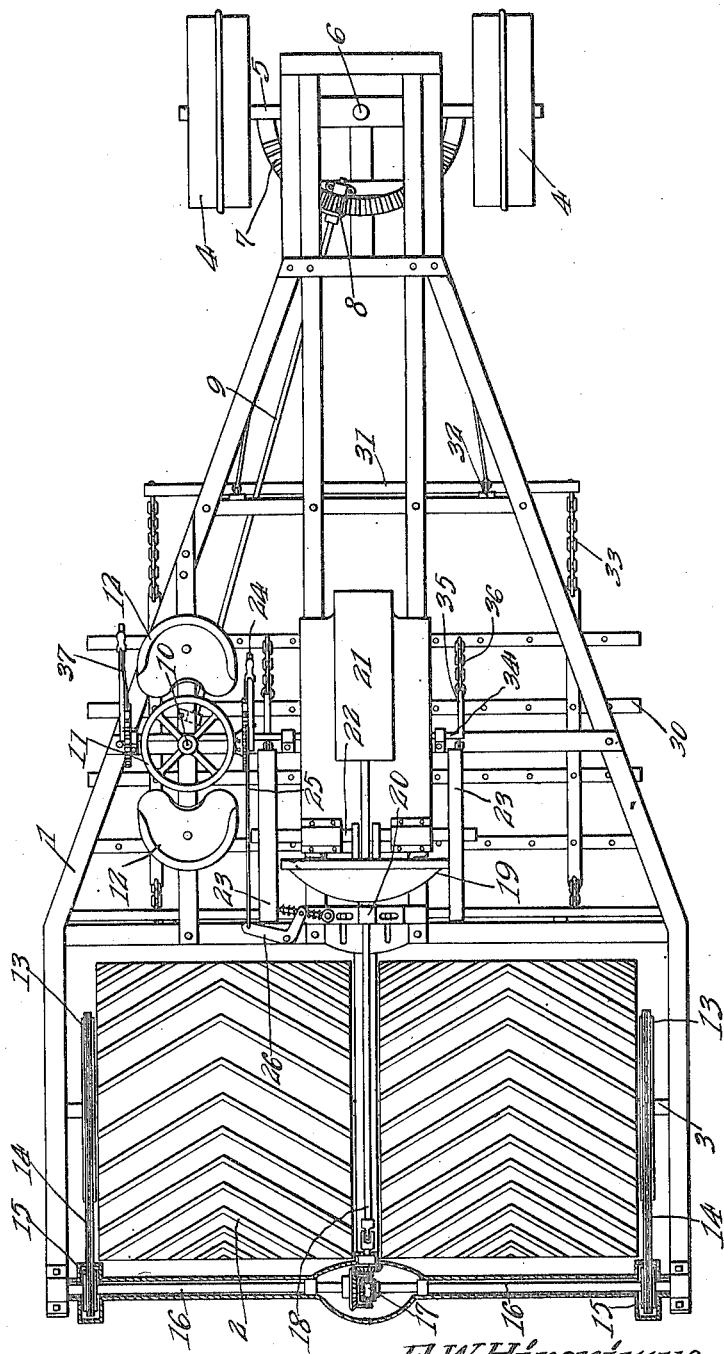

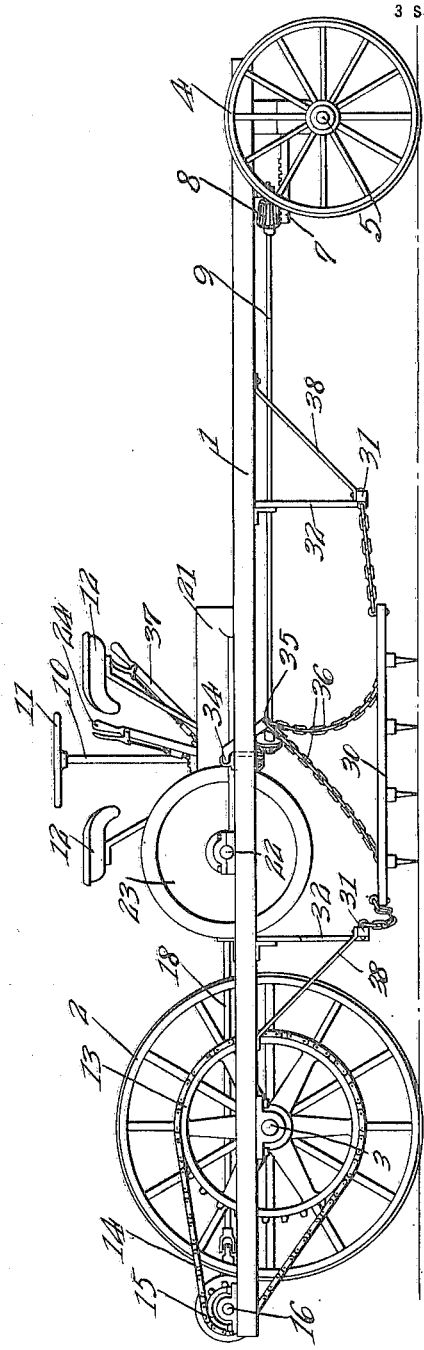

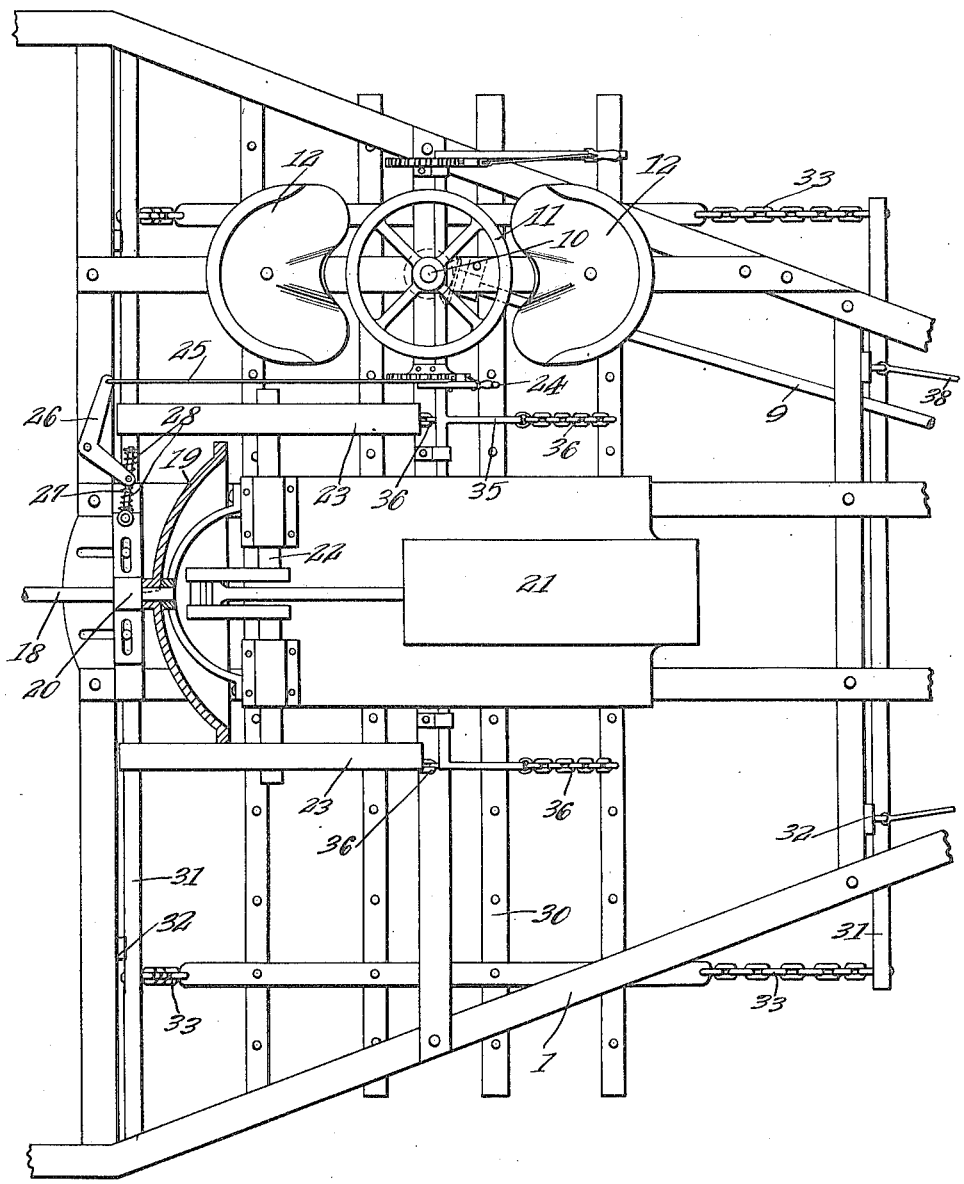

FRED W. HIRONIMUS, OF MOUNT VERNON, INDIANA, ASSIGNOR OF ONE-THIRD TO RICHARD TOPPER AND ONE-THIRD TO GEORGE MAUER.

COMBINED TRACTOR, ROLLER, AND HARROW.

1,255,420. Specification of Letters Patent. Patented Feb. 5, 1918.

Application filed July 12, 1917. Serial No. 180,152.

*To all whom it may concern:*

Be it known that I, FRED W. HIRONIMUS, a citizen of the United States, residing at Mount Vernon, in the county of Posey and State of Indiana, have invented a new and useful Combination Tractor, Roller, and Harrow, of which the following is a specification.

The present invention appertains to agricultural machines, and aims to provide a novel and improved machine adapted especially for use on farms and combining a tractor, roller and harrow, the machine embodying a novel assemblage of the component elements whereby to enhance the utility and efficiency thereof.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made within the scope of what is claimed, without departing from the spirit of the invention.

The invention is illustrated in the accompanying drawings, wherein:

Figure 1 is a plan view of the machine.

Fig. 2 is a side elevation thereof.

Fig. 3 is an enlarged fragmental plan view.

The machine embodies a vehicle comprising the frame 1 having one end relatively wide and the other end relatively narrow, a roller 2 carried for rotation within the wider end portion of the frame by an axle or shaft 3 supporting the frame, and steering wheels 4 at the opposite sides of the narrower end of the frame and mounted on the axle 5 which is connected by a fifth wheel or pivot 6 to the narrower end portion of the frame. The roller 2 is preferably composed of two sections or wheels, and said roller is disposed transversely and extends almost the full width of the wider portion of the frame.

In order to steer the vehicle, the axle 5 is provided with a gear segment 7 with which a pinion 8 meshes, said pinion being carried by a shaft 9 journaled to the frame and operatively connected with an upstanding steering shaft 10 having a hand wheel 11 thereon. Seats 12 are carried by the frame at opposite sides of the hand wheel 11, whereby the operator may face in either direction, thus facilitating the propulsion of the vehicle in either direction. A single reversible seat can be used instead of two seats, as will be readily apparent, the seat simply being moved from one side of the hand wheel to the other. When the hand wheel 11 is rotated, this rotates the shaft 9 and pinion 8, to oscillate the steering axle 5.

The sections of the rollers 2 provide propelling wheels, the same having attached thereto at their opposite ends, sprocket wheels 13 connected by endless sprocket chains 14 with sprocket wheels 15 secured to shafts 16 extending toward opposite sides from an intermediate differential gearing 17, said shafts 16 being carried by the frame, preferably within a suitable housing which also incloses the differential gearing. A longitudinal shaft 18 extends between the sections or wheels of the roller 2 to the differential gearing 17 to drive the shafts 16 and therefore rotate the roller, and the shaft 18 carries a friction wheel 19 at its forward end, the hub of the wheel 19 being feathered or slidable upon the shaft 18 and being journaled in a bearing 20 mounted upon the frame for transverse and longitudinal movements. A suitable engine 21 or other prime mover is mounted upon the frame, and its transverse crank shaft 22 has mounted thereon friction disks 23, which also serve as fly wheels, the friction wheel 19 being disposed between the disks 23 to alternately engage them when the bearing 20 is shifted transversely through the medium of a hand lever 24 carried by the frame. This hand lever 24 is connected by a link 25 or otherwise with a bell crank lever 26 fulcrumed upon the frame at one side of the shaft 18, and a rod 27 pivotally connected with the bearing 20 extends slidably through one arm of the lever 26 and has opposite springs 28 bearing against said lever whereby the rod 27 is yieldably moved thereby to shift the bearing 20 toward either side and bring the friction wheel 19 against one friction disk 23 or the other. By shifting the hand lever 24, the friction wheel 19 can be brought against either friction disk, so that the shaft 18 and roller 2 will be rotated in opposite directions, to propel the vehicle accordingly. By sliding the bearing 20 longitudinally, this will adjust the friction wheel 19 closer to or farther from the shaft 22 of the friction disks 23, to change the speed.

A harrow 30 of any suitable construction is disposed below the frame between the ends thereof, and is trailed from the frame when it is moved in either direction. For this purpose, transverse bars 31 are suspended from the frame by hangers 32 between the harrow and ends of the frame, and chains or other flexible elements 33 connect said bars 31 and the harrow 30, so that no matter in which direction the vehicle is moved, the harrow will be pulled by one set of chains 33, the other set being slackened.

In order to raise the harrow off of the ground, a transverse rock shaft 24 is journaled on the frame, and has arms 35 connected by diverged chains or flexible elements 36 with the harrow, and said shaft 34 has a hand lever 37 which when swung in one direction, will raise the arms 35 so that the chains 36 will lift the harrow, to render the same inoperative.

Braces 38 can be used to connect both bars 31 with the frame 1 to render the structure rigid.

As above explained, the machine can be run in either direction, according to the circumstances. Thus, with the harrow down, the machine in running with the wheels 4 foremost, will result in the harrow harrowing the ground in advance of the roller 2, and said roller will serve to pack the harrowed soil, but if the machine is run in the opposite direction, the harrow will trail in rear of the roller 2, thus harrowing the ground in rear of that over which the roller has passed. When the harrow is lifted off of the ground, the machine can be used as a roller or as a tractor for pulling plows, or other objects.

Having thus described the invention, what is claimed as new is:

A tractor embodying a frame, a roller comprising sections disposed end to end and supporting the frame, steering means for the frame, a differential gearing at one side of the roller, a prime mover at the opposite side of the roller having a crank shaft parallel therewith, shafts extending toward the opposite sides from the differential gearing and connected to the respective roller sections at their opposite ends, a pair of friction disks carried by said crank shaft, a shaft extending between the roller sections and connected to the differential gearing to drive it, a dished friction wheel mounted on the last mentioned shaft between and having its edge alternately engageable with said friction disks, the crank of the crank shaft being arranged to work within said dished friction wheel when said wheel is moved close to the crank shaft, and manually operable means for shifting said friction wheel toward and away from the crank shaft and into and out of engagement with the friction disks.

In testimony that I claim the foregoing as my own, I have hereto affixed my signature in the presence of two witnesses.

FRED W. HIRONIMUS.

Witnesses:
M. W. MORGAN,
U. S. MARRS.